US009690921B2

(12) United States Patent
Ren

(10) Patent No.: US 9,690,921 B2
(45) Date of Patent: Jun. 27, 2017

(54) PROCESSING APPARATUS AND STORAGE MEDIUM

(71) Applicant: Brother Kogyo Kabushiki Kaisha, Nagoya-shi, Aichi-ken (JP)

(72) Inventor: Yongyong Ren, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 94 days.

(21) Appl. No.: 14/500,100

(22) Filed: Sep. 29, 2014

(65) Prior Publication Data

US 2015/0096016 A1 Apr. 2, 2015

(30) Foreign Application Priority Data

Sep. 30, 2013 (JP) ................................. 2013-205334

(51) Int. Cl.
*G06F 21/34* (2013.01)
*G06F 21/35* (2013.01)
*G06F 21/60* (2013.01)

(52) U.S. Cl.
CPC .............. *G06F 21/34* (2013.01); *G06F 21/35* (2013.01); *G06F 21/608* (2013.01)

(58) Field of Classification Search
CPC ......... G06F 21/34; G06F 21/35; G06F 21/608
USPC .......................................................... 726/20
See application file for complete search history.

(56) References Cited

U.S. PATENT DOCUMENTS

| 2009/0318190 | A1 | 12/2009 | Shinozaki |
| 2011/0173686 | A1 | 7/2011 | Ueno et al. |
| 2012/0258662 | A1* | 10/2012 | Takayama ............. H04W 36/14 455/41.1 |

FOREIGN PATENT DOCUMENTS

| JP | 2010-108348 A | 5/2010 |
| JP | 2010-198086 A | 9/2010 |
| WO | 2007/105525 A1 | 9/2007 |

\* cited by examiner

*Primary Examiner* — Hadi Armouche
*Assistant Examiner* — Angela Holmes
(74) *Attorney, Agent, or Firm* — Banner & Witcoff, Ltd.

(57) ABSTRACT

A processing apparatus includes a process performing unit, an operation unit, a processor and memory. The processing apparatus receives first identification information from a communication device, acquires second identification information input by the operation unit, determines whether registration of the first and second identification information is permitted, registers registration information in which the first and second identification information are associated, when the first identification information is received after registering the registration information, performs authentication based on the first identification information, and, when the second identification information is acquired after registering the registration information, performs authentication based on the second identification information. In both cases where the authentication has been performed based on the first and second identification information, the process performing unit performs the specific process by using information managed in association with the registration information.

9 Claims, 7 Drawing Sheets

FIG. 2A

| | | | USER INFORMATION | | | |
|---|---|---|---|---|---|---|
| DEVICE ID | USER ID | PASSWORD | COPY | NUMBER OF SHEETS (SHEETS/WEEK) | SCAN | NUMBER OF TIMES (TIMES/WEEK) |
| DID_A | UID_A | PWD_A | OK | 15 | NG | — |
| DID_B | UID_B | PWD_B | NG | — | OK | 10 |

| COPY | NUMBER OF SHEETS (SHEETS/WEEK) | SCAN | NUMBER OF TIMES (TIMES/WEEK) |
|---|---|---|---|
| OK | 20 | OK | 20 |

LOGIN

PLEASE PASS YOUR CARD OVER NFC I/F — MS1

IF YOU WANT TO LOG IN USING USER ID, PLEASE INPUT USER ID AND PASSWORD — MS2

USER ID [____] F3

PASSWORD [____] F4

[LOGIN] BT3

INFORMATION INPUT

USER REGISTRATION WILL BE PERFORMED
PLEASE INPUT FOLLOWING INFORMATION

USER ID [____] F5   PASSWORD [____] F6

E-MAIL [____] F7

COPY   ● USE (RB5)   ○ NOT USE (RB6)
NUMBER OF SHEETS (SHEETS/WEEK) [____] F8

SCAN   ● USE (RB7)   ○ NOT USE (RB8)
NUMBER OF TIMES (TIMES/WEEK) [____] F9

[REGISTRATION APPLICATION] BT4

| DEVICE ID | USER ID | PASSWORD | USER INFORMATION | | |
|---|---|---|---|---|---|
| | | | COPY | NUMBER OF SHEETS (SHEETS/WEEK) | SCAN | NUMBER OF TIMES (TIMES/WEEK) |
| DID_A | UID_A | PWD_A | OK | 15 | NG | — |
| DID_B | UID_B | PWD_B | NG | — | OK | 10 |
| DID_C | UID_C | PWD_C | OK | 15 | OK | 15 |

232, 232A, 232B, 232C, FI1, VI1, FI2, VI2

PROCESSING APPARATUS AND STORAGE MEDIUM

CROSS-REFERENCE TO RELATED APPLICATIONS

This application claims priority from Japanese Patent Application No. 2013-205334 filed on Sep. 30, 2013, the entire contents of which are incorporated herein by reference.

TECHNICAL FIELD

Aspects of the present invention relate to a technology for registering identification information for authentication.

BACKGROUND

Some processing apparatuses such as printers and multi-functional peripherals perform authentication for each user. By performing authentication, for example, the processing apparatus can restrict on usable functions for each user.

For example, there has been disclosed a technology for registering information in the IC card of a user, whose user information has been registered, in order to authenticate the user. Specifically, a user name and a password are acquired from a registered user, and user authentication is performed. If the user authentication has succeeded, information in the IC card of the user is acquired. Then, the information in the IC card of the user is registered in association with the registered user information.

SUMMARY

However, in the above described technology, there is a possibility that the process for registering information for authentication may become complicated.

Accordingly, an object of aspects of the present invention is to provide a technology capable of eliminating the complexity of the process for registering information for authentication.

Aspects of the present invention have been made to solve at least a part of the above-mentioned problem, and can be implemented in the following application examples.

A processing apparatus including: a process performing unit configured to perform a specific process; an operation unit configured to be operated by a user; a processor; and memory storing computer-readable instructions therein, the computer-readable instructions, when executed by the processor, causing the processing apparatus to perform: receiving first identification information from a communication device; acquiring second identification information, in a case where the second identification information is input by the operation unit; determining whether registration of the first identification information and the second identification information is permitted by a management apparatus; when determined that the registration is permitted, registering, in a storage unit, registration information in which the first identification information and the second identification information are associated with each other; performing authentication based on the first identification information, in a case where the first identification information is received after the registration of the registration information, and performing authentication based on the second identification information, in a case where the second identification information is acquired after the registration of the registration information, in both cases where the authentication has been performed based on the first identification information and the authentication has been performed based on the second identification information, controlling the process performing unit to perform the specific process by using information which is managed in association with the registration information.

According to the above described configuration, registration information, in which the first identification information received from the communication device and the second identification information input by an operation of the user, are associated with each other, is registered. Therefore, after the registration, it is possible to perform the authentication by using each of the first and second identification information. As a result, it is possible to eliminate the complication of the process for registering information for authentication.

Also, the present invention can be implemented in various forms such as an image forming apparatus, a management apparatus for managing the image processing apparatus, methods and computer programs for implementing the functions of the image processing apparatus and the management apparatus, and storage medium having the computer program stored therein.

BRIEF DESCRIPTION OF DRAWINGS

FIGS. 2A and 2B are views illustrating examples of a user information table 232 and an allowable information table 233;

FIG. 6 is a view illustrating an example of a login image UI1;

FIG. 7 is a view illustrating an example of an information input image UI2;

FIG. 8 is a view illustrating a user information table 232 obtained by registering new user information 232C in the user information table 232 shown in FIG. 2A;

DETAILED DESCRIPTION

A. First Example

A-1. Configuration of System

Figure 1:
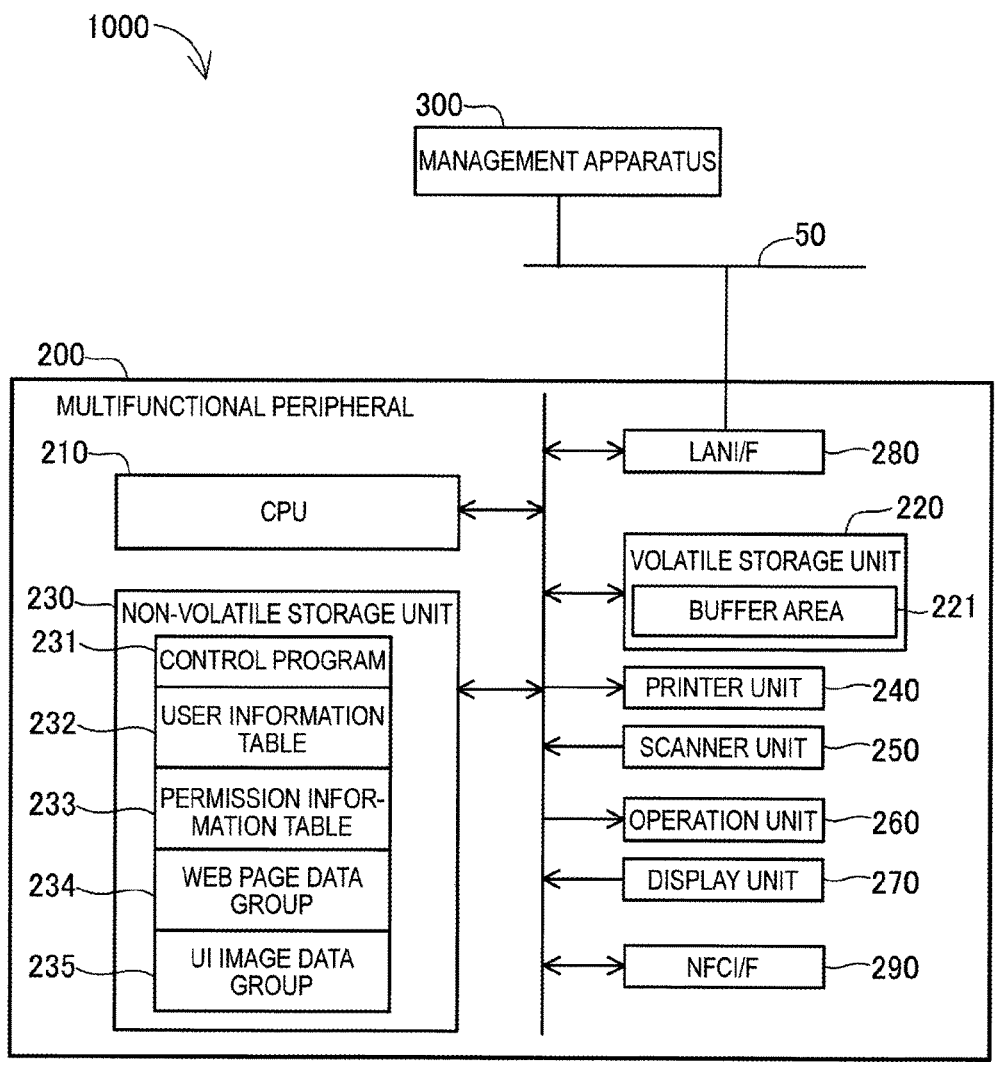
FIG. 1 is a block diagram illustrating a configuration of a system 1000 according to an example.

Hereinafter, an embodiment of the present invention will be described based on embodiments. FIG. 1 is a block diagram illustrating the configuration of a system 1000 including a multifunctional peripheral 200 serving a processing apparatus. The system 1000 includes a multifunctional peripheral 200, a management apparatus 300, and an IC card 500 and a mobile phone 400 serving as communication devices. The multifunctional peripheral 200 and the management apparatus 300 are connected to a local area network (LAN) 50, whereby they can perform communication with each other through the LAN 50. The LAN 50 is established, for example, based on the standards of 802.3 of the Institute of Electrical and Electronics Engineers (IEEE).

The multifunctional peripheral 200 includes a CPU 210, a volatile storage unit 220 such as a RAM, a non-volatile storage unit 230 such as a hard disk drive or a flash memory, a printer unit 240, a scanner unit 250, an operation unit 260 such as a touch panel and buttons, a display unit 270 including a display panel such as a liquid crystal panel overlapping the touch panel, a LAN I/F 280, and an NFC I/F 290. The printer unit 240 prints images by a predetermined system (for example, an inkjet system or a laser system). The scanner unit 250 optically reads documents by use of an optical sensor (for example, a contact image sensor (CIS)).

The LAN I/F 280 is a wired or wireless interface for connection with the LAN 50 described above. The NFC I/F 290 is an interface for performing wireless communication according to a near field communication (NFC) system. The NFC system is a communication system for wireless communication with a very short communication distance of about 10 cm (so-called near field communication), and is, for example, a communication system based on the standards of ISO/IEC 21481 or ISO/IEC 18092. The CPU 210 can control the NFC I/F 290, thereby implementing a function of receiving information from the IC card 500 or the mobile phone 400 (a so-called NFC reader function).

The volatile storage unit 220 has a buffer area 221 for temporarily storing various intermediate data, which are generated when the CPU 210 performs processes. In the non-volatile storage unit 230, a control program 231 for controlling the multifunctional peripheral 200, a user information table 232, an allowable information table 233, a WEB page data group 234, and a UI image data group 235 are stored. The WEB page data group 234 includes WEB pages for an administrator, specifically, a plurality of WEB page data items representing a WEB page WP1 (FIG. 4), a WEB page WP2 (FIG. 10), and the like (to be described below), respectively. The UI image data group 235 includes UI images to be displayed on the display unit 270, specifically, a plurality of UI image data items representing a login image UI1 (FIG. 6), an information input image UI2 (FIG. 7), and the like (to be described below), respectively.

The control program 231 is, for example, stored in the non-volatile storage unit 230 in advance during shipping of the multifunctional peripheral 200. Also, for example, the control program 231 can be provided in a form in which it can be downloaded from a server.

The CPU 210 executes the control program 231, thereby implementing a control function of controlling the multifunctional peripheral 200. Specifically, the CPU 210 includes, for example, a function of controlling the printer unit 240 and the scanner unit 250, thereby performing specific processes. Specifically, the specific processes include processes for implementing image processing functions such as a printing function, a scanning function, and a copying function which can be implementing by combining the printing function and the scanning function. Also, the CPU 210 executes the control program 231, thereby implementing a process of registering identification information to be used for user authentication (to be described below), and a process of performing user authentication using the registered identification information. Further, the CPU 210 executes the control program 231, thereby serving as a WEB server which provides the WEB pages for the administrator by use of the WEB page data group 234. The CPU 210 executes the control program 231, thereby serving as a mail client which transmits and receives electronic mails.

The management apparatus 300 is a known computer having a CPU and a memory (not shown), for example, a so-called personal computer. In the management apparatus 300, a browser program and a mail client program is installed. The CPU of the management apparatus 300 executes those programs, thereby acting a browser for browsing WEB pages, and a mail client for transmitting and receiving electronic mails.

The IC card 500 is, for example, a so-called contactless IC card, which has an IC chip including a memory, and an antenna coil (not shown). The IC card 500 can transmit data stored in the memory to an apparatus having the NFC reader function described above (for example, the multifunctional peripheral 200). Data stored in the memory of the IC card 500 includes card identification information identifying the card. As the IC card 500, for example, an IC card which can be used to pay transportation fares and prices for goods, an IC card which can be used as a membership card or an employee card, or the like can be used. The kind of usable IC cards is, for example, presented to the user of the multifunctional peripheral 200 in advance by the vendor of the multifunctional peripheral 200. If the user has an IC card of the kind presented by the vendor, the user can use the corresponding IC card as the IC card 500 for the system 1000.

The mobile phone 400 is a terminal belonging to the user, and is, for example, a mobile multifunctional phone called a smart phone. The mobile phone 400 has a wireless communication function (not shown) according to an NFC system, and can operate in a card emulation mode, thereby implementing a data transmitting function equivalent to that of the IC card 500. The mobile phone 400 executes, for example, a program (also referred to as application) provided by the vendor of the multifunctional peripheral 200, thereby generating terminal identification information depending on the mobile phone 400, and storing the terminal identification information in the internal memory of the portable terminal 400. The mobile phone 400 can transmit the terminal identification information to an apparatus having the NFC reader function described above (for example, the multifunctional peripheral 200).

The card identification information stored in the memory of the IC card 500, and the terminal identification information stored in the mobile phone 400 are also referred to as device IDs. At least one of the IC card 500 and the mobile phone 400 needs to be used by the user.

FIGS. 2A and 2B are views illustrating examples of the user information table 232 and the allowable information table 233 of the multifunctional peripheral 200. The user information table 232 of FIG. 2A is a table in which user information to be managed for each user is registered. For example, in FIG. 2A, user information 232A and 232B of two users is registered. Each of the user information 232A and 232B includes a device ID serving as first identification information, a user ID serving as second identification information, a password, and use information. In other words, a device ID, a user ID, a password, and use information are associated with each other to form one set of user information.

The use information define the use ranges of the multifunctional peripheral 200 permitted for the users identified by the device IDs and the user IDs included in the user information. The use information includes, for example, propriety information FI indicating whether it is possible to use specific functions which can be performed by the multifunctional peripheral 200. The propriety information FI includes, for example, information FI1 indicating whether it has been permitted to use the copying function, and information FI2 indicating whether it has been permitted to use the scanning function (FIG. 2A). In a case where it has been permitted to use a specific function, the use information further include use amount information VI indicating a use amount permitted with respect to the corresponding specific function. In the example of FIG. 2A, the use amount information VI1 of the copying function indicates the number of paper sheets which can be copied every week. Also, the use amount information VI2 of the scanning function indicates the number of times of scanning which can be performed, for example, every week. As described above, as the use amount information VI of a specific function, information indicating the number of times the specific function can be used during a specific period, or the number of media (for example, printed paper sheets) or data items (for example, scan data items) which can be generated by the specific function during a specific period, can be used.

In the allowable information table 233 of FIG. 2B, there has been set allowable information indicating the use range (hereinafter, also referred to as an allowed range) of the multifunctional peripheral 200 which can be allowed if a request for using the multifunctional peripheral 200 is received from the user in a first authentication-related process (to be described below). As shown in FIG. 2B, the allowable information includes the same kinds of information items as those of the user information of the user information table 232 described above, thereby defining the allowable range. Specifically, in the example of FIG. 2B, the allowable information includes propriety information FI3 indicating whether it is allowed to use the copying function, and propriety information FI4 indicating whether it is allowed to use the scanning function. Also, the allowable information includes use amount information VI3 and VI4 indicating the upper limits of allowable use amounts (hereinafter, also referred to as upper use amount limits) with respect to the copying function and the scanning function, respectively.

A-2. Operation of System

A-2-1. Setting of Allowable Information

Figure 3:
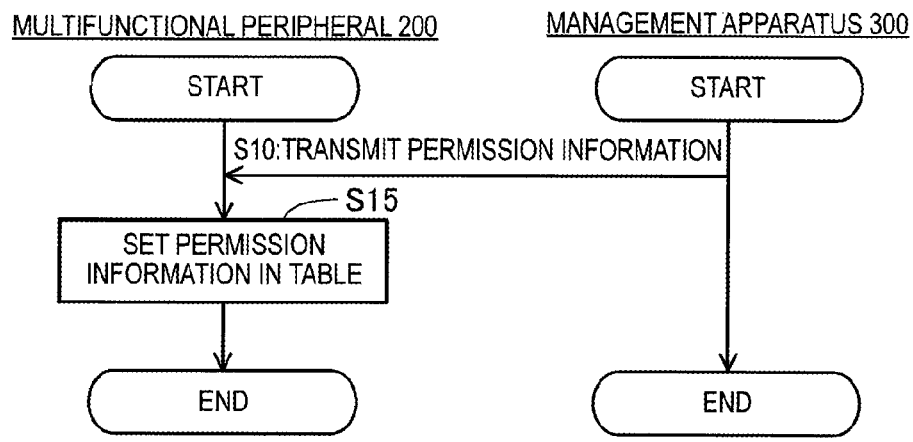
FIG. 3 is a flow chart illustrating a process of setting the allowable information table 233.

FIG. 3 is a flow chart illustrating a process of setting the allowable information table 233 (FIG. 2B). The process of setting the allowable information table 233 is a process of setting the above described allowable information in the allowable information table 233 of the multifunctional peripheral 200, and is performed prior to the first authentication-related process (FIG. 5) which will be described later.

In STEP S10, the management apparatus 300 transmits allowable information, which needs to be set in the allowable information table 233, to the multifunctional peripheral 200, based on an operation by the administrator of the system 1000. Specifically, based on an operation by the administrator, the management apparatus 300 executes the browser program, and accesses a WEB page, identified by a predetermined uniform resource locator (URL), by use of the browser function. As a result, the CPU 210 of the multifunctional peripheral 200 transmits predetermined WEB page data representing a WEB page WP1 for inputting allowable information, to the management apparatus 300. As a result, the WEB page WP1 is displayed on the display unit of the management apparatus 300.

Figure 4:
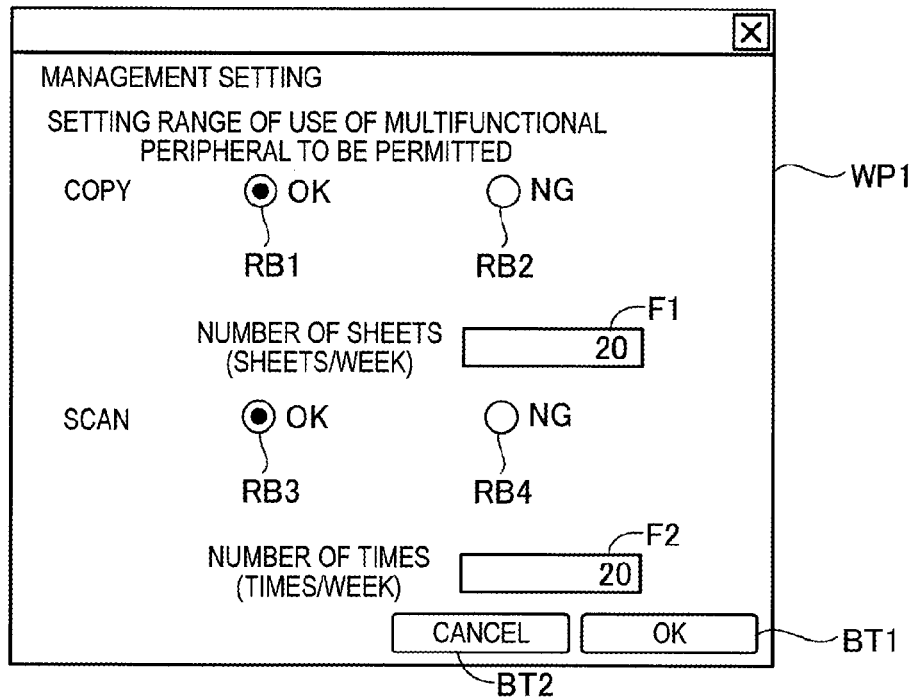
FIG. 4 is a view illustrating an example of a WEB page WP1 for inputting allowable information.

FIG. 4 is a view illustrating an example of the WEB page WP1 for inputting allowable information. The WEB page WP1 of FIG. 4 includes radio buttons RB1 to RB4, fields F1 and F2, a transmission button BT1, and a cancel button BT2 for canceling transmission. The radio buttons RB1 to RB4 are selected as to whether to allow use of each of the copying function and the scanning function. The fields F1 and F2 receive upper use amount limit inputs with respect to the copying function and the scanning function, respectively. If the transmission button BT1 is pushed, the management apparatus 300 transmits information indicating the selection states of the radio buttons RB1 to RB4 at that moment when the transmission button BT1 was pushed, and information input in the fields F1 and F2, as allowable information, to the multifunctional peripheral 200.

In STEP S15, the CPU 210 of the multifunctional peripheral 200 sets the allowable information received from the management apparatus 300 in the allowable information table 233 (FIG. 2B).

A-2-2. Authentication-Related Process

Figure 5:
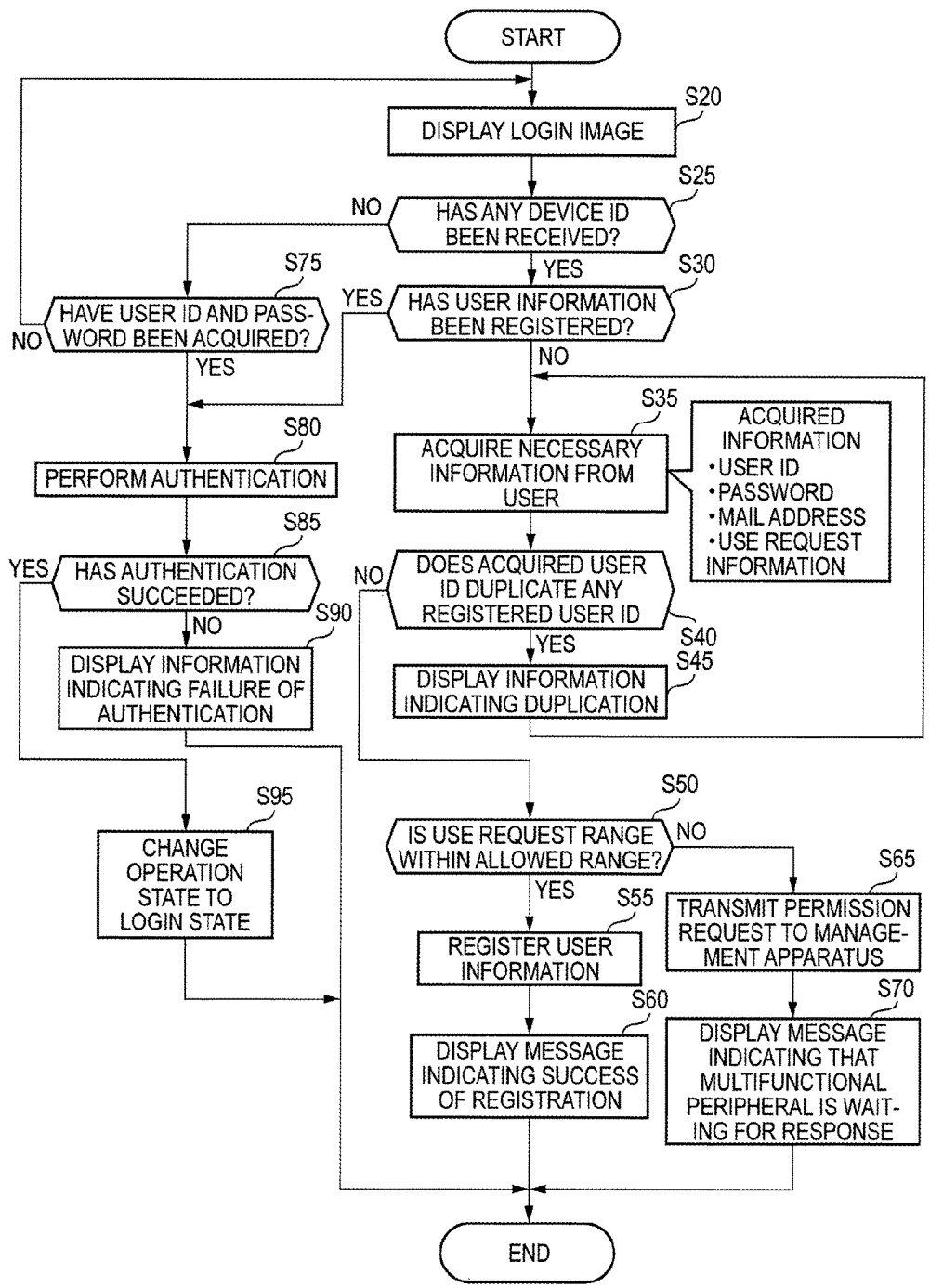
FIG. 5 is a flow chart illustrating a first authentication-related process.

FIG. 5 is a flow chart illustrating the first authentication-related process. For example, in a case where the allowable information table 233 has been set, and the user has not logged in to the multifunctional peripheral 200, the first authentication-related process is performed by the CPU 210 of the multifunctional peripheral 200. The first authentication-related process includes a process of registering user information such as a device ID or a user ID in the user information table 232, and a process of performing authentication by using the device ID or the user ID having been registered.

In STEP S20, the CPU 210 displays a login image as a UI image on the display unit 270. FIG. 6 is a view illustrating an example of a login image UI1. The login image UI1 of FIG. 6 includes messages MS1 and MS2, a field F3 for receiving a user ID input, a field F4 for receiving a password input, and a login button BT3. The message MS 1 indicates to the user that the user can log in by passing the IC card 500 over the NFC I/F 290. The message MS2 indicates to user that the user can log in by inputting the user ID and the password in the fields F3 and F4. If the user operates the operation unit 260, thereby inputting the user ID and the password in the fields F3 and F4 of the login image UI1 and pushing the login button BT3, the CPU 210 acquires the user ID and the password.

In STEP S25, the CPU 210 determines whether any device ID (specifically, card identification information or terminal identification information) has been received from a communication device (specifically, the mobile phone 400 or the IC card 500). Specifically, the CPU 210 controls the NFC I/F 290, thereby performing regular transmission of a detection signal for detecting a communication device, that is, a so-called polling. In this state, if a communication device is passed over the NFC I/F 290 such that the communication device is within a predetermined distance (for example, 10 cm) from the NFC I/F 290, the communication device receives the detection signal and transmits a response signal to the detection signal to the NFC I/F 290. The transmission of the response signal causes an NFC connection to be established between the NFC I/F 290 and the communication device. Then, the device ID is transmitted from the communication device to the NFC I/F 290 by NFC. That is, if the user passes the communication device over the NFC I/F 290, the CPU 210 receives the device ID from the communication device through the NFC I/F 290.

Since NFC is used as described above, it is possible to easily and securely receive the device ID. That is, by the user passing the communication device over the NFC I/F 290, the CPU 210 can easily receive the device ID. Also, for example, as compared to wireless communication according to the standards of 802.11 of IEEE (so-called Wi-Fi communication), since the communication distance of NFC is very short, communication is unlikely to be intercepted by any other person. Therefore, the CPU 210 can securely receive the device ID.

In a case where a device ID has been received ("YES" in STEP S25), in STEP S30, the CPU 210 determines whether user information including the received device ID has been registered in the user information table 232. In the present example, since the device ID is registered together with other user information items such as a corresponding user ID and a corresponding password at the same time, in a case where the device ID has not been registered, the other user information items have also not been registered. In a case where the user information including the received device ID has not been registered ("NO" in STEP S30), the CPU 210 performs a series of processes of STEPS S35 to S70 for registering the user information including the received device ID.

In STEP S35, the CPU 210 acquires information necessary to register the user information, from the user. The information necessary to register the user information includes the user ID and the password which need to be registered together with the device ID in the user information table 232, use request information, and a mail address. Specifically, the CPU 210 displays the information input image UI2 and receives input of those information items from the user.

FIG. 7 is a view illustrating an example of the information input image UI2. The information input image UI2 of FIG. 7 includes fields F5, F6, and F7 for receiving input of the user ID, the password, and the mail address, radio buttons RB5 to RB8 and fields F7 and F8 for receiving use request information, and a registration application button BT4. As can be seen from the information input image UI2, the use request information includes the same kinds of information as those of the use information (FIG. 2A) and the allowable information (FIG. 2B), and indicates the request range for requesting use of the multifunctional peripheral 200. Specifically, the use request information includes propriety information indicating whether to request use of each of the copying function and the scanning function. Also, the use request information includes use amount information which indicates a use amount to be requested, with respect to each function to be requested to be used. The propriety information relative to the copying function and the scanning function is received through the radio buttons RB5 to RB8, and the use amount information relative to the copying function and the scanning function is received through fields F8 and F9.

If the user operates the operation unit 260, thereby inputting information in the fields F5 to F9 of the information input image UI2 and pushing the registration application button BT4, the CPU 210 acquires the information having been input in the fields F5 to F9. Also, the CPU 210 acquires information indicating the selection states of the radio buttons RB5 to RB8 at that moment when the registration application button BT4 was pushed. As a result, the CPU 210 can acquire the above described information necessary to register the user information.

Subsequently, in STEP S40, the CPU 210 determines whether the user ID acquired in STEP S35 duplicates any user ID registered in the user information table 232. In a case where the acquired user ID duplicates a user ID registered in the user information table 232 ("YES" in STEP S40), in STEP S45, the CPU 210 displays information indicating the duplication of the user ID on the display unit 270. In other words, in a case where the user ID, which was acquired in STEP S35 and should have been unregistered, has been registered in the user information table 232, the CPU 210 displays error information indicating that the user ID acquired in STEP S35 has been registered in the user information table 232 on the display unit. As a result, it is possible to suppress the user ID from being doubly registered in the user information table 232. After the error information is displayed, the CPU 210 returns to STEP S35 in which the CPU 210 displays the information input image UI2 on the display unit 270 again, and acquires another user ID from the user.

In a case where the acquired user ID does not duplicate any user ID registered in the user information table 232 ("NO" in STEP S40), in STEP S50, the CPU 210 determines whether the use request range indicated by the use request information acquired in STEP S35 is within the allowable range indicated by the allowable information set in the allowable information table 233. Specifically, in a case where use of the printing function has been requested by the use request information, only if use of the printing function has been allowed by the allowable information, and a use amount requested by the use request information is equal to or smaller than a corresponding upper use amount limit defined by the allowable information, it is determined that the use request range is within the allowable range with respect to the printing function. In a case where use of the printing function has not been requested by the use request information, it is always determined that the use request range is within the allowable range with respect to the printing function. The same applies to the scanning function too. Then, in a case where it is determined with respect to both of the printing function and the scanning function that each use request range is within the allowable range, it is finally determined that the use request range is within the allowable range. Meanwhile, in a case where it is determined with respect to at least one of the printing function and the scanning function that the use request range is out of the allowable range, it is finally determined that the use request range is out of the allowable range.

In a case where the use request range is within the allowable range ("YES" in STEP S50), in STEP S55, the CPU 210 registers the new user information in the user information table 232. That is, the unregistered device ID received in STEP S25 and the unregistered user ID and the unregistered password acquired in STEP S35 are newly registered in the user information table 232, in association with one another. Further, in association with the device ID and the user ID which is newly registered, the use request information acquired in STEP S35 is registered in the user information table 232, as use information to which use is permitted.

As described above, based on the allowable information set in the user information table 232, it is possible to appropriately and quickly determine whether registration of the device ID and the user ID is permitted by the management apparatus 300, without inquiring the management apparatus 300. Therefore, the user can immediately log in to the multifunctional periphery 200 by using the device ID and the user ID to be described later and use the functions of the multifunctional peripheral 200, and thus it is convenient. Also, the administrator can save time and effort for determining whether to permit a registration application for each user, and thus it is possible to reduce the load of the administrator. Further, in the user information table 232, the device ID received from the communication device, and the user ID, the password, and the use request information input by the user are registered as permitted use information. That is, since the user takes the initiative in performing registration of the user information, it is possible to further reduce the load of the administrator.

FIG. 8 is a view illustrating user information table 232 obtained by registering new user information 232C in the user information table 232 shown in FIG. 2. In the example of FIG. 8, the new user information 232C includes a device ID "DID_C", a user ID "UID_C", and a password "PWD_C". Further, the user information 232C includes propriety information FI1 indicating whether it is permitted to use the copying function, and propriety information FI2 indicating whether it is permitted to use the scanning function, as use information. Furthermore, the user information 232C includes use amount information VI1 indicating that the use amount of the copying function permitted is 15 sheets per week, and use amount information VI2 indicating that the use amount of the scanning function permitted is 15 times per week, as the use information.

If the user information is newly registered, subsequently, in STEP S60, the CPU 210 displays a message indicating that registration of the user information has succeeded on the display unit 270, and then finishes the first authentication-related process.

Meanwhile, in a case where it is determined in STEP S50 that the use request range is out of the allowable range ("NO" in STEP S50), in STEP S65, the CPU 210 transmits a permission request to the management apparatus 300. Specifically, the CPU 210 transmits a permission request for requesting a permission notification in response to a registration application of the user to the management apparatus 300. In other words, the permission notification can also mean a notification for permitting registration of the device ID and the user ID. Specifically, the CPU 210 transmits an electronic mail as the permission request to the mail address of the administrator registered in advance. In the electronic mail serving as the permission request, for example, a specific URL, and a message indicating that a registration application has been performed by the user, are described.

Subsequently, in STEP S70, the CPU 210 displays a message for notifying the user that the multifunctional peripheral 200 is waiting for a response to the permission request transmitted to the management apparatus 300 on the display unit 270, and then finishes the first authentication-related process.

Meanwhile, in a case where it is determined in STEP S25 that any device ID has not been received ("NO" in STEP S25), in STEP S75, the CPU 210 determines whether a user ID and a password have been acquired through the login image UI1 of FIG. 6. STEP S75 is a step for acquiring a registered user ID and a registered password for authentication for login. In a case where it is determined that a user ID and a password have not been acquired ("NO" in STEP S75), the CPU 210 returns to STEP S20. That is, in this case, the display of the login image UI1 is maintained.

In a case where it is determined in STEP S75 that a user ID and a password have been acquired ("YES" in STEP S75), and in a case where it is determined in STEP S30 that the device ID received in STEP S25 has been registered in the user information table 232 ("YES" in STEP S30), in STEP S80, the CPU 210 performs user authentication. Specifically, in a case where a user ID and a password have been acquired, in STEP S80, the CPU 210 performs authentication based on the acquired user ID, and in a case where a registered device ID has been acquired, in STEP S80, the CPU 210 performs authentication based on the device ID.

In the present example, the authentication based on a device ID does not need additional information such as a password. Therefore, in the present example, the CPU 210 unconditionally determines that the authentication based on a registered device ID has succeeded. Authentication based on a user ID needs input of a password. Therefore, the CPU 210 determines whether the user ID and the password acquired have been registered, as information included in one set of user information, that is, as a user ID and a password associated with each other, in the user information table 232. In a case where the acquired user ID and the password have been registered in the user information table 232, it is determined that the authentication has succeeded, and in a case where the acquired user ID and the password have not been registered, it is determined that the authentication has failed.

In a case where the authentication of STEP S80 has failed ("NO" in STEP S85), the CPU 210 displays information indicating that the authentication has failed, on the display unit 270, in STEP S90, and then finishes the first authentication-related process. In a case where the authentication of STEP S80 has succeeded ("YES" in STEP S85), the CPU 210 changes the operation state of the multifunctional peripheral 200 to a login state in STEP S95, and then finishes the first authentication-related process. In the present example, in the login state, the CPU 210 performs a process of implementing the copying function or the scanning function by using the use information (FIG. 2) in which the device ID and the user ID are associated with each other. Specifically, within the use range indicated by the corresponding use information, based on an instruction of the user, the CPU 210 controls the printer unit 240 or the scanner unit 250 such that the printer unit 240 or the scanner unit 250 performs the copying function or the scanning function. Since a device ID and a user ID associated with each other are associated with common use information (FIG. 2A), a login state after authentication based on a specific device ID is the same as a login state after authentication based on a specific user ID associated with the specific device ID.

Figure 9:
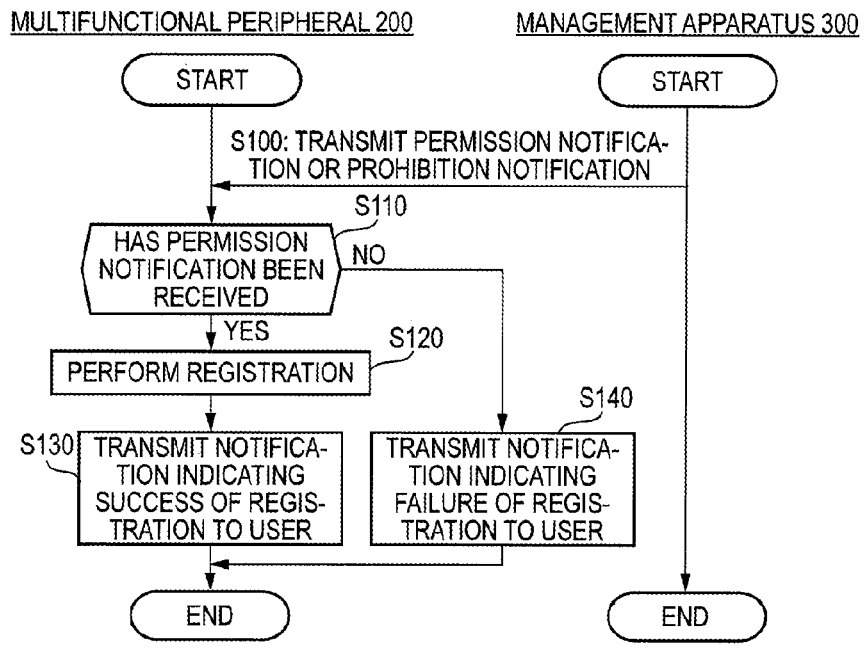
FIG. 9 is a flow chart illustrating a second authentication-related process.

FIG. 9 is a flow chart illustrating a second authentication-related process. In the case where the permission request for requesting a permission notification in response to the registration application of the user is transmitted from the multifunctional peripheral 200 to the management apparatus 300 (STEP S65 of FIG. 5), the second authentication-related process is performed. For example, in a case where the administrator operating the management apparatus 300 clicks the specific URL included in the electronic mail serving as the permission request, the second authentication-related process is started.

In STEP S100, based on an operation of the administrator of the system 1000, the management apparatus 300 transmits a permission notification for permitting registration or a prohibition notification for prohibiting registration, as a response to the permission request, to the multifunctional peripheral 200. Specifically, based on the operation of the administrator, the management apparatus 300 executes the browser program and accesses a WEB page, identified by the specific URL, by use of the browser function. As a result, the CPU 210 of the multifunctional peripheral 200 transmits WEB page data representing the WEB page WP2 for inputting an instruction for transmitting the permission notification or the prohibition notification, to the management apparatus 300. As a result, on the display unit of the management apparatus 300, the WEB page WP2 is displayed.

Figure 10:
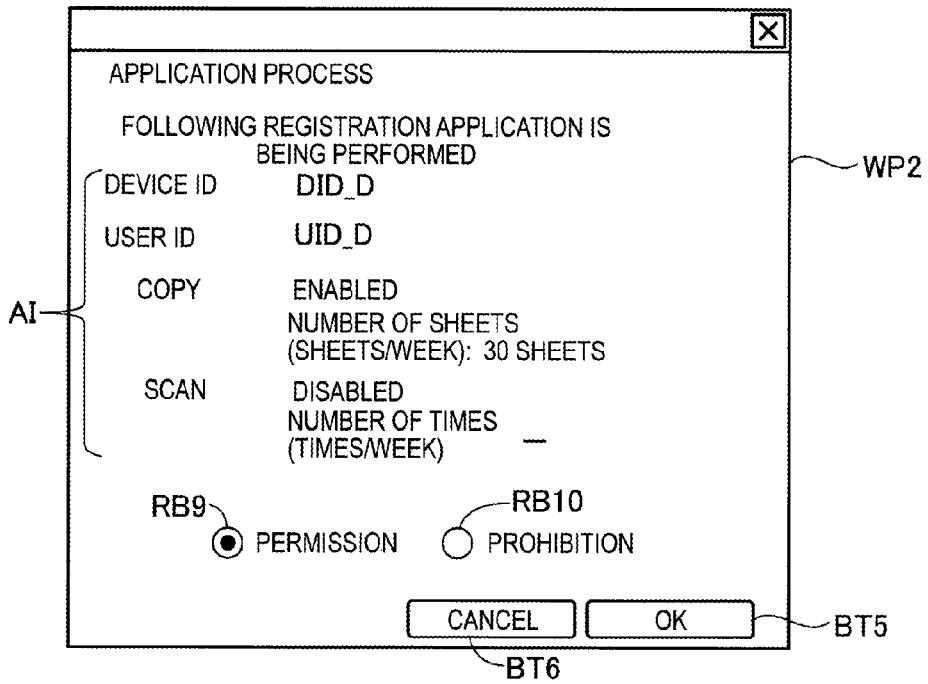
FIG. 10 is a view illustrating an example of a WEB page WP2 for inputting an instruction for transmitting permission notification or prohibition notification.

FIG. 10 is a view illustrating an example of the WEB page WP2 for inputting an instruction for transmitting the permission notification or the prohibition notification. The WEB page WP2 of FIG. 10 includes application information AI indicating the content of the registration application, a radio button RB9 for inputting an instruction for transmitting the permission notification, a radio button RB10 for inputting an instruction for transmitting the prohibition notification, a transmission button BT5, and a cancel button BT6 for canceling display of the WEB page WP2. The application information AI includes the device ID which is the object of the registration application, the user ID, and the content of the use request information. If the transmission button BT5 is pushed, the management apparatus 300 transmits information indicating the selection states of the radio buttons RB9 and RB10 when the transmission button BT5 was pushed, to the multifunctional peripheral 200. In the example of FIG. 10, information indicating that the radio button RB9 has been selected is the permission notification, and information indicating that the radio button RB 10 has been selected is the prohibition notification. As a result, the CPU 210 of the multifunctional peripheral 200 receives either of the permission notification and the prohibition notification through the LAN I/F 280.

Subsequently, in STEP S110, the CPU 210 determines whether the permission notification or the prohibition notification has been received. In a case where the permission notification has been received ("YES" in STEP S110), in STEP S120, the CPU 210 registers the new user information corresponding to the permission request permitted by the permission information, in the user information table 232. That is, the unregistered device ID, the unregistered user ID, and the unregistered password are newly registered in the user information table 232, in association with one another. Further, in association with the device ID and the user ID which are newly registered, the use request information is registered as use information permitting use, in the user information table 232. As described above, based on reception of the permission notification from the management apparatus 300, the multifunctional peripheral 200 can appropriately determine that registration of the device ID and the user ID is permitted in the management apparatus 300.

If the user information is newly registered, subsequently, in STEP S130, the CPU 210 transmits a notification indication that registration of the user information has succeeded, to the user. This notification is performed by an electronic mail for the mail address acquired from the user through the information input image UI2 (FIG. 7). As a result, the user can easily recognize that registration of the user information has succeeded whereby it becomes possible to use the multifunctional peripheral 200.

In a case where the prohibition notification has been received ("NO" in STEP S110), in STEP S140, the CPU 210 transmits a notification indicating that registration of the user information has failed to the user, without performing registration of the new user information. This notification is performed by an electronic mail for the mail address acquired from the user through the information input image UI2, similarly to STEP S130 of transmitting the notification indicating success of registration. As a result, the user can easily recognize that registration of the user information has failed. As described above, based on reception of the prohibition notification from the management apparatus 300, the multifunctional peripheral 200 can appropriately determine that registration of the device ID and the user ID is prohibited in the management apparatus 300.

If wither of the registration success notification and the registration failure notification is transmitted, the second authentication-related process is finished.

According to the present example described above, it is possible to eliminate the complication of the process for registering the user information, in which the registration information including the device ID received from the communication device through the NFC I/F 290 and the user ID acquired from the user through the operation unit 260 are associated with each other, that is, information for authentication.

Specifically, whether registration of the user information is permitted by the management apparatus 300 is determined in STEP S50 of FIG. 5 with reference to the allowable information table 233 (FIG. 2B) set in advance, or is determined in STEP S110 of FIG. 9 according to the permission notification received from the management apparatus 300. Then, in a case where registration is permitted, the user information including the device ID and the user ID is registered in the user information table 232 in STEP S55 of FIG. 5 or STEP S120 of FIG. 9. After the registration, both authentications based on the device ID and authentication based on the user ID can be performed in STEP S80 of FIG. 5. In both cases where the login has been performed according to authentication based on the device ID and the login has been performed according to the authentication based on the user ID, the operation state of the multifunctional peripheral 200 is changed to the same login state in STEP S95. As a result, it is possible to eliminate the complication of the process for registering information for authentication.

Also, according to the present example, in a case where the use request indicated by the use request information received from the user is out of the allowable range indicated by the allowable information set in the allowable information table 233 ("NO" in STEP S50 of FIG. 5), first, it is determined that registration of the user information is not permitted by the management apparatus 300. Then, the permission request is transmitted from the multifunctional peripheral 200 to the management apparatus 300 in STEP S65 of FIG. 5. Thereafter, in a case where the permission notification is received in response to the permission request by the multifunctional peripheral 200 ("YES" in STEP S110 of FIG. 9), it is determined that registration of the user information has been finally permitted, and registration of the corresponding user information is performed in STEP S120 of FIG. 9. Therefore, even in a case where it is determined based on the allowable information table 233 that registration is not permitted, the management apparatus 300 can flexibly determine whether to permit registration.

Further, in the present example, in a case where the device ID received from the communication device through the NFC I/F 290 has been registered ("YES" in STEP S30 of FIG. 5), authentication based on the device ID is performed in STEP S80 of FIG. 5. Meanwhile, in a case where the corresponding device ID has not been registered ("NO" in STEP S30), the CPU 210 performs a series of processes of STEPS S35 to S70 of FIG. 5 including STEP S50 of FIG. 5 of determining whether registration of the new user information including the device ID is permitted. Therefore, it is possible to perform appropriate processes according to whether the device ID received through the NFC I/F 290 has been registered. As a result, it is possible to eliminate the complication of the authentication process and the process for registering information for authentication.

B. Modified Examples (1) In the above described first example, the device ID is received by use of NFC. However, the device ID may be received by any other communication system. In this case, in view of convenience, it is preferable to use wireless communication, and in view of security, it is preferable to use a communication system having a relatively short communication distance, such as NFC. For example, instead of NFC, a wireless communication system such as TransferJet (registered as a trade mark) can be used. Alternatively, other wireless communication systems such as Bluetooth (registered as a trade mark) and infrared communication can be used.

(2) In the above described example, based on the allowable information table 233 (FIG. 2B) set in advance, the CPU 210 determines whether registration of the user information is permitted by the management apparatus 300, without requesting permission from the management apparatus 300 each time. Alternatively, the determining process using the allowable information table 233 may be omitted. In this case, the process (FIG. 3) of setting the allowable information in the allowable information table 233 is omitted. Further, in the first authentication-related process of FIG. 5, the processes of STEPS S50, S55, and S60 are omitted. That is, whenever user information including an unregistered device ID and an unregistered user ID is acquired, the CPU 210 of the multifunctional peripheral 200 may transmit a permission request for registration of the user information to the management apparatus 300.

(3) In the above described example, as an example of information which is managed in association with a device ID and a user ID associated with each other, use information which is registered together with the device ID and the user ID in the user information table 232 is adopted. However, instead of the use information, or together with the use information, for example, history information indicating the history of use of the multifunctional peripheral 200 for a corresponding user may be used as the information which is managed in association with the device ID and the user ID associated with each other. That is, after user authentication, the CPU 210 of the multifunctional peripheral 200 may perform a process of managing the use history of the multifunctional peripheral 200 for each user, based on corresponding history information.

(4) In the above described example, the storage unit where the user information table 232 and the allowable information table 233 are stored is the non-volatile storage unit 230 of the multifunctional peripheral 200. Alternatively, the user information table 232 and the allowable information table 233 may be stored in an external storage device. For example, the user information table 232 and the allowable information table 233 may be stored in a non-volatile storage unit of the management apparatus 300.

(5) The system 1000 of the above described example includes one multifunctional peripheral 200. Alternatively, the system 1000 may include a plurality of multifunctional peripherals. In this case, the user information table 232 may be shared by the plurality of multifunctional peripherals. For example, the user information table 232 may be stored in a specific multifunctional peripheral of the plurality of multifunctional peripherals, or may be stored in an external storage unit. In a case of performing the first and second authentication-related processes described above, each multifunctional peripheral needs to use the user information table 232 stored in the specific multifunctional peripheral or the external storage unit. For example, in a case of referring to the user information table 232, each multifunctional peripheral needs to acquire the user information table 232 from the specific multifunctional peripheral or the external storage unit, and in a case of registering new registration information in the user information table 232, each multifunctional peripheral needs to transmit an instruction for updating the user information table 232 to the specific multifunctional peripheral or the external storage unit.

(6) In the above described example, the multifunctional peripheral 200 is used as an example of the processing apparatus. Alternatively, the processing apparatus may be another image processing apparatus, specifically, a printer, a scanner, or a facsimile, or may be a processing apparatus other than image processing apparatuses, specifically, a storage device capable of assigning a storage area for each user.

(7) In the above described example, some components implemented by hardware may be replaced with software, and conversely, some components implemented by software may be replaced with hardware.

(8) In a case where some or all of the functions of the present invention are implemented by software, the software (computer program) can be provided by being stored in a computer-readable storage medium. The computer-readable storage medium is not limited to a portable storage medium such as a memory card or a CD-ROM, but includes various internal memory devices, such as a RAM and a ROM, built in computers, and external memory devices, such as a hard disk drive, connected to computers.

Although an embodiment and modified examples of the invention have been described above, the embodiment of the invention described above is provided for the purpose of helping better understanding of the invention and does not limit the scope of the invention. The invention can be changed or modified without departing from the gist of the invention and the scope of claims, and includes equivalents thereof.

What is claimed is:

1. A processing apparatus comprising:
a processor; and
memory storing computer-readable instructions therein, the computer-readable instructions, when executed by the processor, causing the processing apparatus to perform:
receiving device identification information for identifying a communication device from the communication device per se;
acquiring user identification information for identifying a user, in a case where the user identification information is received through user input;
determining whether the acquired user identification information has been registered;
determining whether the received device identification information has been registered;
determining whether registration of the received device identification information and the acquired user identification information is permitted by a management apparatus in a case where the received device identification information is determined to not have been registered;
in a case where the acquired user identification information is determined to not have been registered, the received device identification information is determined to not have been registered, and the registration is determined to be permitted, registering, in a storage unit, registration information in which the device identification information and the user identification information are associated with each other;
performing authentication based on the device identification information, in a case where the device identification information is received after the registration of the registration information or in a case where the received device identification information is determined to have been registered, performing authentication based on the user identification information, in a case where the user identification information is acquired after the registration of the registration information; and in both cases where the authentication has been performed based on the device identification information and the authentication has been performed based on the user identification information, controlling a device to perform a specific process by using information which is managed in association with the registration information.

2. The processing apparatus according to claim 1, wherein the computer-readable instructions, when executed by the processor, cause the processing apparatus to further perform:
receiving, from the management apparatus, a permission notification which permits the registration of the device identification information and the user identification information, and
wherein determining whether registration of the device identification information and the user identification information is permitted by a management apparatus includes determining, in response to receiving the permission notification, that the registration of the device identification information and the user identification information is permitted.

3. The processing apparatus according to claim 1, wherein the computer-readable instructions, when executed by the processor, further cause the processing apparatus to further perform:
receiving allowable information indicating an allowable range of use of the processing apparatus; and
accepting request information indicating a request to use the processing apparatus,
wherein determining whether registration of the device identification information and the user identification information is permitted by a management apparatus includes determining, in a case where the request of the use indicated by the request information is within the allowable range indicated by the allowable information, that the registration of the device identification information and the user identification information is permitted, and
wherein in a case where the registration of the device identification information and the user identification information is permitted, the registering is performed to register, in the storage unit, the registration information in which the device identification information, the user identification information, and the request information are associated with each another.

4. The processing apparatus according to claim 3, wherein determining whether registration of the device identification information and the user identification information is permitted by a management apparatus includes determining, in a case where the request of the use indicated by the request information is out of the allowable range indicated by the allowable information, that the registration of the device identification information and the user identification information is not permitted,
wherein the computer-readable instructions, when executed by the processor, cause the processing apparatus to further perform:
in a case where the registration of the device identification information and the user identification information is determined to not be permitted, transmitting, to the management apparatus, a permission request to request a permission notification which permits the registration of the device identification information and the user identification information, and
receiving the permission notification from the management apparatus, and
wherein determining whether registration of the device identification information and the user identification information is permitted by a management apparatus includes determining, in response to receiving the permission notification, that the registration of the device identification information and the user identification information is permitted.

5. The processing apparatus according to claim 1, wherein the device identification information is received by using Near Field Communication.

6. The processing apparatus according to claim 1, wherein the computer-readable instructions, when executed by the processor, cause the processing apparatus to further perform:
in a case where the acquired user identification information is determined to have been registered, displaying, on a display unit, information indicating that the user identification information has been registered.

7. The processing apparatus according to claim 1, wherein the memory include the storage unit.

8. The processing apparatus according to claim 1, wherein the registering of the registration information is performed in the storage unit of an external storage device.

9. A non-transitory computer-readable storage medium storing computer-readable instructions, when executed by a processor of a computer, cause the computer to perform:
receiving device identification information for identifying a communication device from the communication device per se:
acquiring user identification information for identifying a user, the user identification information being acquired through user input;
determining whether the acquired user identification information has been registered;
determining whether the received device identification information has been registered;
determining whether registration of the received device identification information and the acquired user identification information is permitted by a management apparatus in a case where the received device identification information is determined to not have been registered;
in a case where the acquired user identification information is determined to not have been registered, the received device identification information is determined to not have been registered, and the registration is determined to be permitted, registering, in a storage unit, registration information in which the device identification information and the user identification information are associated with each other;
performing authentication based on the device identification information, in a case where the device identification information is received after the registration of the registration information or in a case where the received device identification information is determined to have been registered;

performing authentication based on the user identification information, in a case where the user identification information is acquired after the registration of the registration information; and in both cases where the authentication has been performed based on the device identification information and the authentication has been performed based on the user identification information, performing a specific process by using information which is managed in association with the registration information.

\* \* \* \* \*